(12) United States Patent
Bhojwani et al.

(10) Patent No.: US 7,792,266 B1
(45) Date of Patent: Sep. 7, 2010

(54) SOFTWARE PROGRAM AND METHOD FOR REDUCING MISDIRECTED CALLS TO A SELECT DESTINATION

(75) Inventors: Sandeep M. Bhojwani, San Jose, CA (US); Jayadev Billa, San Jose, CA (US)

(73) Assignee: Bevocal LLC, Sunnyvale, CA (US)

( * ) Notice: Subject to any disclaimer, the term of this patent is extended or adjusted under 35 U.S.C. 154(b) by 1014 days.

(21) Appl. No.: 11/529,078

(22) Filed: Sep. 28, 2006

(51) Int. Cl.
*H04M 3/42* (2006.01)

(52) U.S. Cl. .............................. 379/211.02; 379/207.11

(58) Field of Classification Search ............ 379/211.02, 379/207.13
See application file for complete search history.

(56) References Cited

U.S. PATENT DOCUMENTS

| 5,136,636 | A | * | 8/1992 | Wegrzynowicz | ....... | 379/221.01 |
| 6,771,761 | B1 | * | 8/2004 | LaPierre | ................ | 379/211.02 |
| 2004/0207508 | A1 | | 10/2004 | Lin et al. | | |
| 2007/0190986 | A1 | | 8/2007 | Lee | | |

FOREIGN PATENT DOCUMENTS

| EP | 1 435 720 A2 | 7/2004 |
| GB | 2 206 265 A | 12/1988 |
| GB | 2 360 418 A | 9/2001 |
| WO | WO 0062518 | 10/2000 |

* cited by examiner

*Primary Examiner*—Creighton Smith
(74) *Attorney, Agent, or Firm*—Tina M. Lessani; Lessani & Lessani LLP

(57) ABSTRACT

A method and software application reduce the occurrence of misdirected calls to one or more select destinations The software application resides on a user's phone and "listens" to phone numbers dialed by a user to determine if the user has dialed a phone number for one of such select destinations. In response to the user dialing one of such phone numbers, the software application on the phone effectively "intercepts" the call and enables the phone to provide the user with a list of destination options prior to placing the call to the dialed phone number. In one embodiment, the list is provided in audio form by playing a voice prompt with the list, as well as in visual form by displaying the list in the user interface of the user's phone. The list helps disambiguate the intent of the user in dialing the phone number by asking the user to either (i) confirm he wants the destination associated with the phone number or (ii) select another option. In one embodiment, if the user does not select a choice after a period of time, the call is placed to the destination associated with the originally dialed phone number.

25 Claims, 5 Drawing Sheets

SOFTWARE PROGRAM AND METHOD FOR REDUCING MISDIRECTED CALLS TO A SELECT DESTINATION

BACKGROUND OF THE INVENTION

1. Field of the Invention

This invention relates generally to software applications on digital phones, and more specifically, to a software application that reduces the occurrence of misdirected calls to one or more select destinations.

2. Description of the Background Art

Some large companies provide customers with multiple phone numbers which can be used to contact the company, where each phone number is meant to serve a different purpose. For example, a wireless communication company may have one phone number for customer service, a second phone number for technical assistance, and a third phone number for an automated, self-service store through which a user can purchase products and services.

In such cases, users sometimes do not pay attention to the purpose that a phone number serves, and they will dial one number when they should instead dial another number. Such misdirected calls can increase consumer frustration and waste unnecessary operator and IVR system resources. Therefore, there is a desire to reduce such misdirected calls.

SUMMARY

The present invention provides a method and software application that reduces the occurrence of misdirected calls to one or more select destinations. The software application resides on a user's phone and "listens" to phone numbers dialed by a user to determine if the user has dialed a phone number for one of such select destinations. In response to the user dialing one of such phone numbers, the software application on the phone effectively "intercepts" the call and enables the phone to provide the user with a list of destination options prior to placing the call to the dialed phone number. In one embodiment, the list of destination options is presented in both audio and visual form by playing a voice prompt with the list and by displaying the list in the user interface of the phone. Providing the user with a list of destination options helps disambiguate the intent of the user in dialing the phone number by asking the user to either (i) confirm he wants the destination associated with the phone number or (ii) select another option. In one embodiment, if the user does not select a choice after a period of time, the call is placed to the destination associated with the originally dialed phone number.

In the preferred embodiment, the destination associated with the phone number originally dialed is the first option in the list. The other options in the list can be common destinations often desired by users when dialing the original number.

DETAILED DESCRIPTION OF THE PREFERRED EMBODIMENTS

Figure 1:
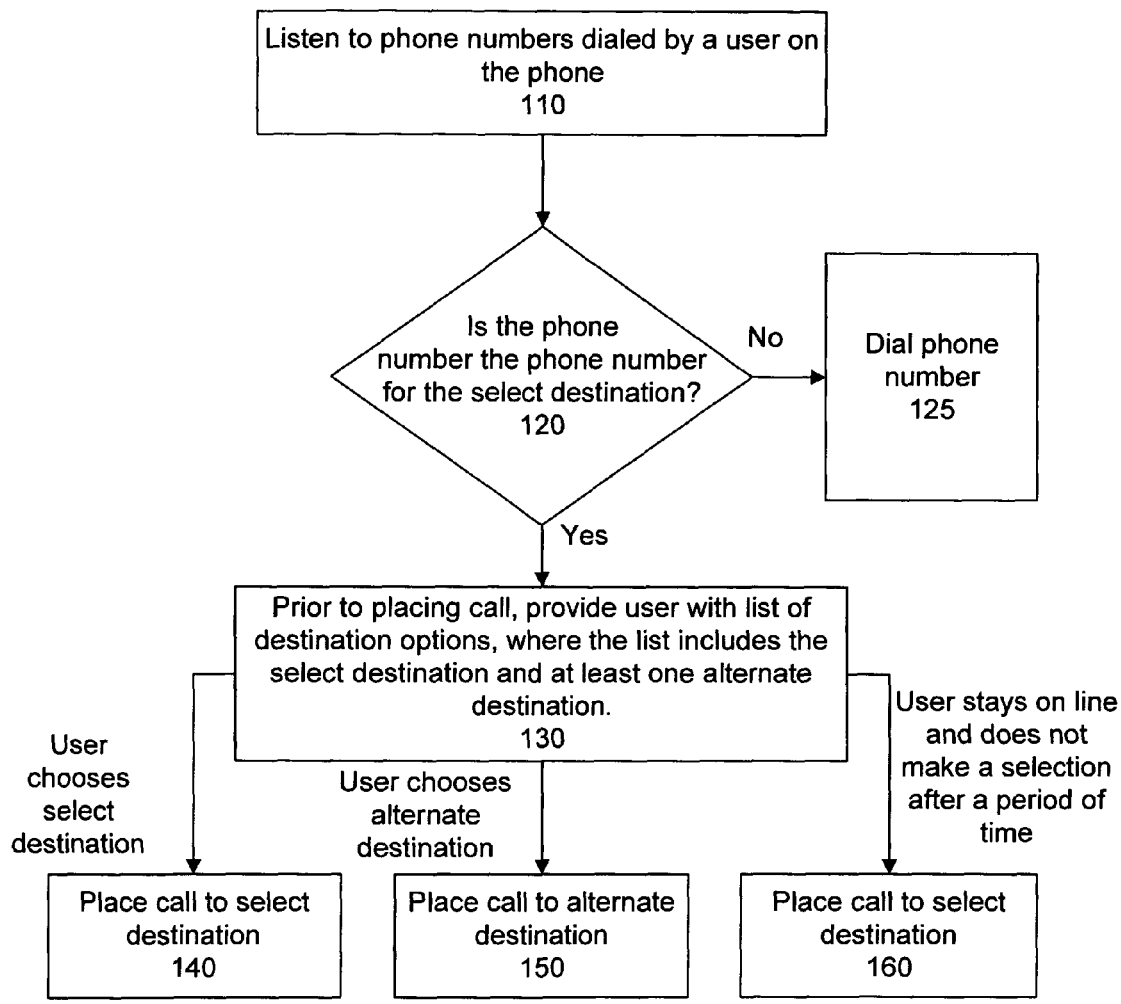
FIG. 1 is a flow chart that illustrates a method, according to one embodiment of the present invention, for reducing the occurrence of misdirected calls to a select destination.

FIG. 1 illustrates a method for reducing the occurrence of misdirected calls to a phone number for a select destination according to one embodiment of the present invention. In this embodiment, the method is performed on a phone and enabled by software running on such phone. Types of phones on which this method can be performed include, but are not limited to, phones that receive and transmit voice and/or data via wireless networks, traditional telecommunication networks (i.e., Plain Old Telephone Service (POTS)), and/or the Internet.

The phone (or more specifically, software on the phone) "listens" to phone numbers dialed by a user on the phone (step 110). When a user dials a phone number, software on the phone determines whether the dialed phone number is the phone number for the select destination (step 120). If the dialed phone number is not the phone number for the select destination, the phone places a call to the dialed phone number. If the dialed phone number is the phone number associated with the select destination, the phone provides the user with a list of destination options prior to placing the call to the select destination, where the list includes the select destination and at least one alternate destination (step 130). In one embodiment, at this stage, the user may think the phone call has already been placed, but software on the phone is just simulating the call experience until the user actually chooses a destination option or a certain amount of time passes (see description corresponding to FIG. 2 for an example of simulating the call experience). In response to the user choosing the select destination from the list, the phone places the call to the select destination (step 140). In response to the user choosing an alternate destination, the phone places a call to the alternate destination instead of to the select destination (step 150). In one embodiment, if the user does not select an option from the list after a period of time, the call is automatically placed to the select destination (step 160).

In one embodiment, "listening" to a phone number involves (1) monitoring the sequence of keystrokes entered by a user prior to a user hitting the "send," "call," "dial," or other button associated with dialing a call and/or (2) monitoring phone numbers entered through voice-activated dialing (such as when a user says "voice mail" to dial the phone number for voice mail). A phone number is not limited to a seven or ten digit phone number for the purposes of this invention. Rather, it can be any sequence of numbers or characters that can be used to generate an outbound call. For example, shortcut phone numbers (such as 411 or *669) can be phone numbers for the purposes of this invention. The above method is not limited to reducing misdirected calls to a single phone number, as the phone can listen for a number of phone numbers.

In the preferred embodiment, the list of destination options is a ranked list in order of the most likely destinations. In most cases, the most likely destination is the destination associated with the phone number originally dialed by the user. The other destination options can be other destinations often desired by users when they dial the phone number associated with the select destination. For example, if a wireless telecommunication company finds that a lot of users dial sales when they really want technical assistance, then misdirected calls to sales can be reduced by listening for the sales phone number on the wireless phone, and, when a user dial the sales phone number, sales can be the first item on the ranked list, and technical assistance can be the second item on the ranked list. The destinations on the list can be displayed as text (e.g., "sales," "technical assistance") and/or phone numbers (e.g., 800-555-1234).

In one embodiment, if the select destination is an interactive voice response (IVR) system, then the alternate destination options can include a different IVR system or a different entry point to the same IVR system.

The alternate destination options can be pre-programmed into the phone or can be generated dynamically based on information in the phone, information transmitted to the phone via an external system (either at the time the user makes a call or earlier), or information contained in a backend database (where such information may be retrieved at the time the user makes a call or earlier).

In the preferred embodiment, the list of destination options is provided in both audio and visual form. The list is provided in audio form by playing a voice prompt that includes the list. Playing a voice prompt minimizes the disruption of the normal call experience. The list is provided in visual form by displaying the list in the phone user interface.

Figure 2:
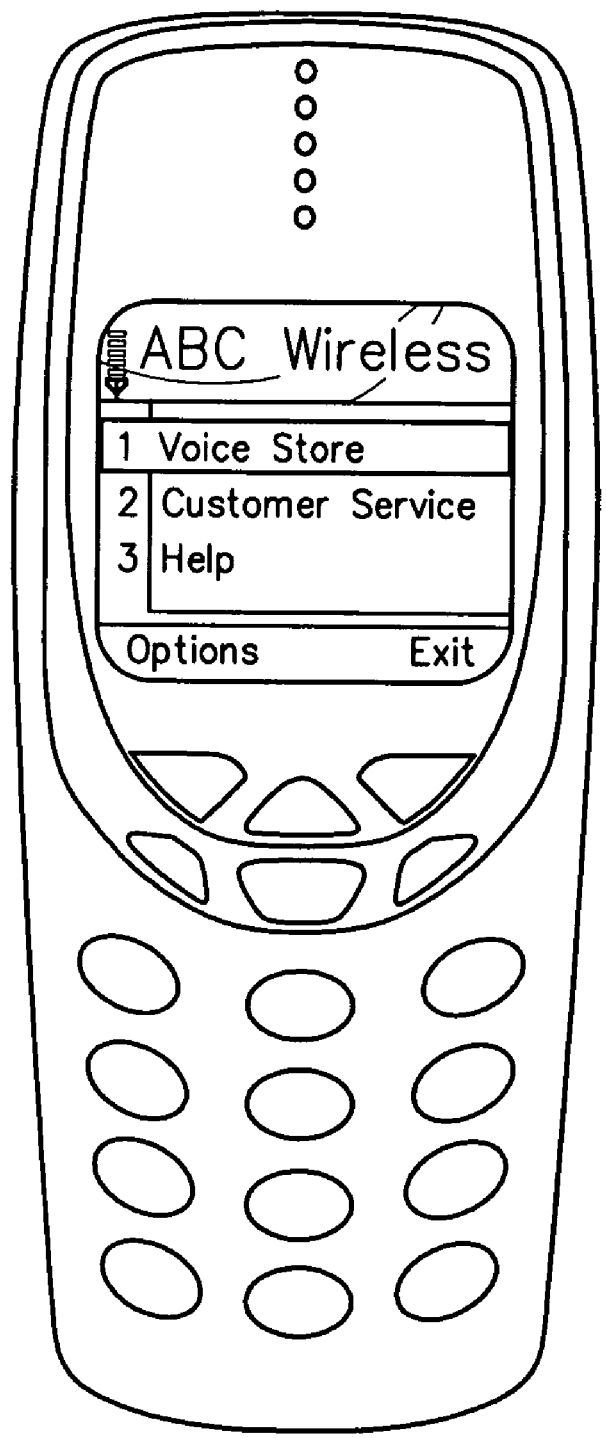
FIG. 2 is a drawing of a wireless phone with a user interface that illustrates an example of a list of destination options.

FIG. 2 illustrates an example of a list of destination options displayed in the user interface of a phone. In this example, the user has dialed a phone number for an automated voice store associated with a wireless communication carrier, and the phone presents the user with "Voice Store" and "Customer Service" as two destination options prior to placing the call to the voice store. The goal of providing this list is to reduce the occurrence that users will erroneously call in to the voice store when they really want customer service. Below is an example of a corresponding voice prompt played to the user that also includes the list of destination options:

"Welcome to the voice store. Press 1 or stay online to continue. Press 2 to go to Customer Service."

Such voice prompt makes the user think that he has actually called into the voice store. However, in this example, the software is just simulating the experience of calling into the voice store by playing the voice prompt. If the user selects "Voice Store," or stays on line, the phone places the call to the voice store. In one embodiment, where the voice store is an IVR system, the call may be placed to an entry point in the IVR that does not include a welcome greeting, as the user has already heard a welcome greeting.

Figure 3:
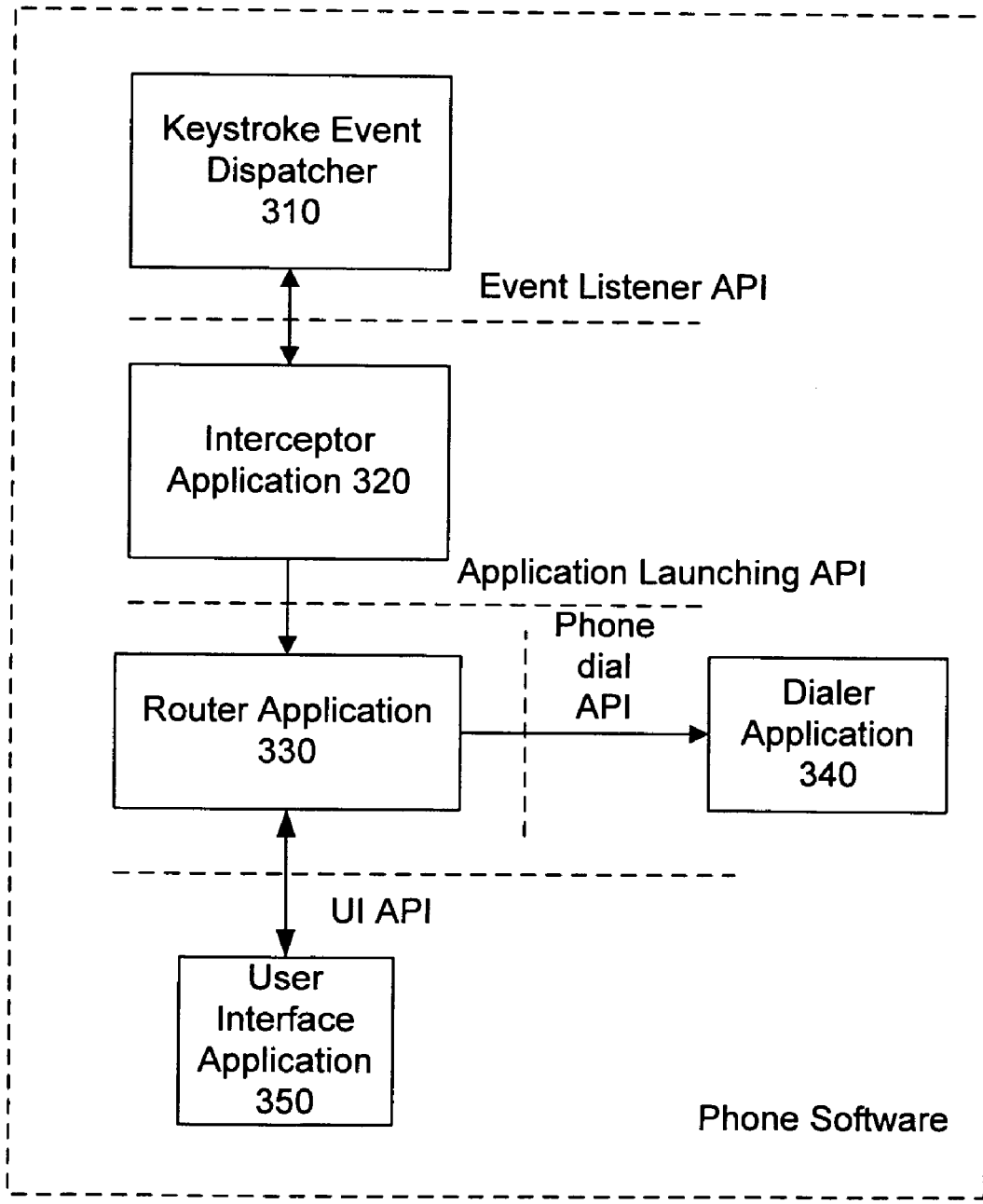
FIG. 3 is a block diagram representation of software on a phone that can be used to implement one embodiment of the present invention.

FIG. 3 illustrates an example of software on a digital phone that can be used to implement the present invention. For ease of explanation, such software can be thought of as divided into various functional modules. These modules are a keystroke event dispatcher 310, an interceptor application 320, a router application 330, a dialer application 340, and a user interface application 350. Keystroke event dispatchers, user interface applications, and dialer applications are well known in the art.

Figure 4:
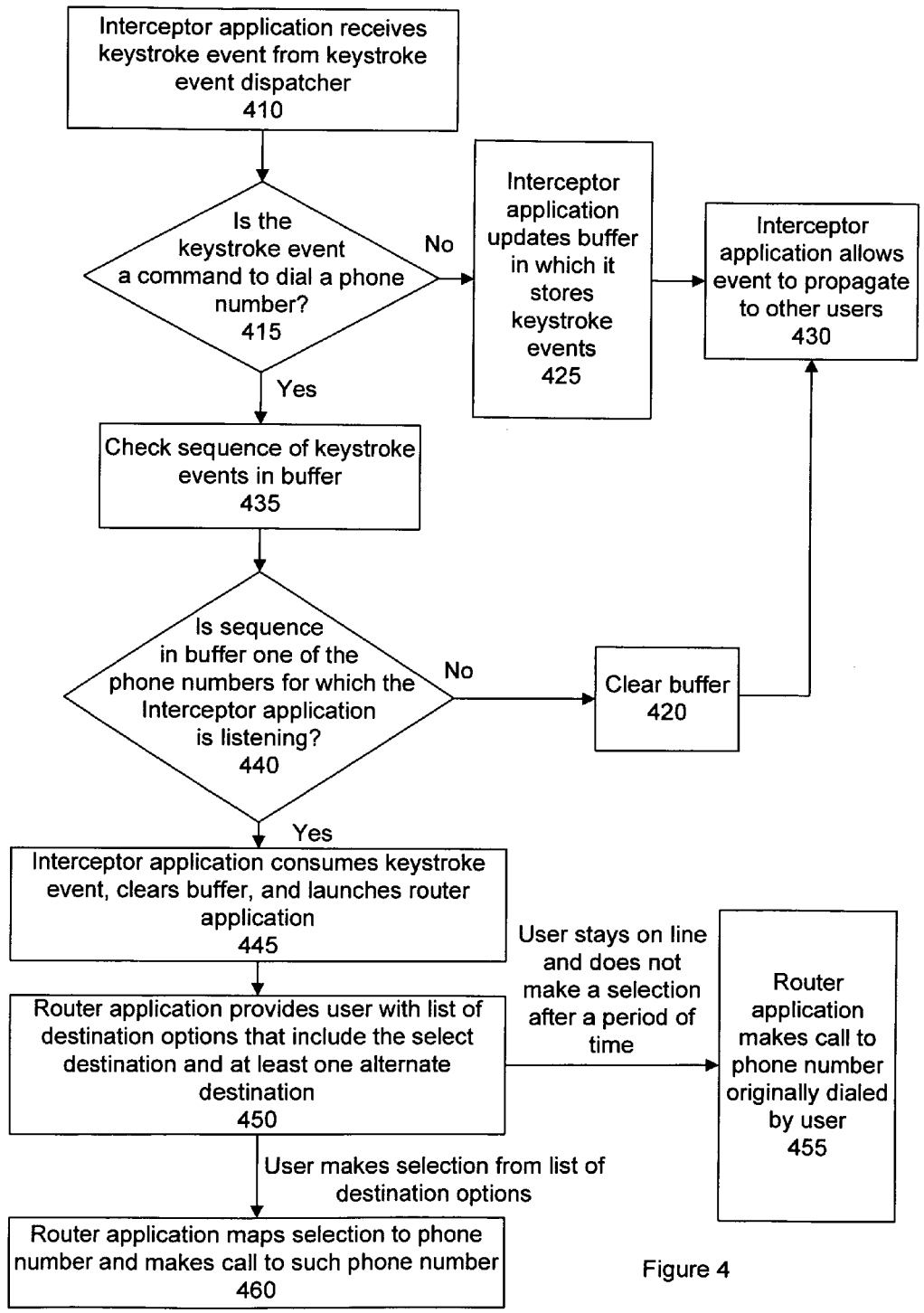
FIG. 4 is a flow chart that illustrates operations of the interceptor and router modules.
Figure 5:
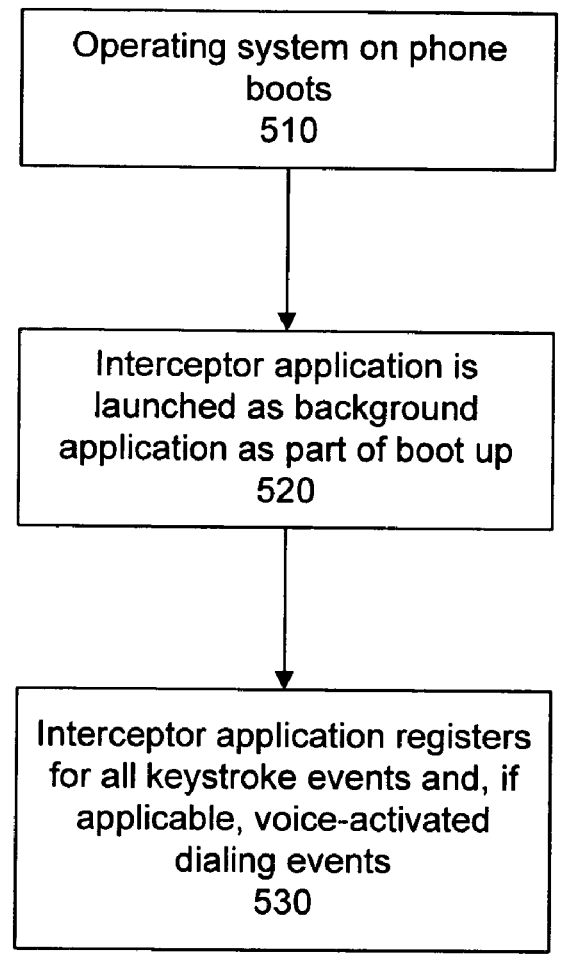
FIG. 5 is a flow chart that illustrates the start-up of the interceptor module.

Those skilled in the art will appreciate that a phone will include additional functionality not represented by the above modules. However, such functionality is well known in the art and a discussion of such functionality is not relevant for an understanding of the invention described herein. Moreover, those skilled in the art will appreciate that there may be many ways to implement the present invention, and the software implementation described herein with respect to FIGS. 3-5 is just one example of an implementation.

The keystroke event dispatcher 310 buffers keystrokes entered by the phone user and provides such keystrokes to other applicable applications on the phone that register for keystroke events. The dialer application 340 registers for keystroke events and dials phone numbers entered by the user, unless such phone numbers are first consumed by the interceptor application 320. The user interface application 350 enables the display of information in the user interface on the phone.

The interceptor application 320 and router applications 330 are the modules that perform the functions described with respect to FIG. 1. The interceptor application 320 registers for keystroke events (as a higher priority application than the dialer module 340) and listens for certain phone numbers. The interceptor application 320 communicates with the keystroke event dispatcher 310 via an applicable event listener application programming interface (API).

The router application 330 is launched by the interceptor application in response to the user dialing a phone number for which the interceptor application is listening. The router application 330 provides the user with the list of destination options associated with such phone number. When a destination option is chosen, the router application 330 dials the phone number associated with the chosen destination.

FIG. 4 illustrates how the interceptor application 320 and router application 330 operate to implement the method described with respect to FIG. 1. When a user hits a key on a phone, the interceptor application 320 receives the keystroke event from the keystroke event dispatcher 310 (step 410). The interceptor application 320 then determines if the key the user entered is a command to dial a phone number (such as the "send" or "dial" button on a wireless, mobile phone) (step 415). If it is not, the interceptor application 320 updates a buffer in which it stores keystroke events (step 425) and lets the event propagate to other listeners of keystrokes, such as the dialer application 340 (step 430). If it is a command to dial a phone number, the interceptor application 320 checks the buffer (step 435) and determines if the sequence in the buffer is one of the phone numbers for which the interceptor application 320 is listening (step 440). If the sequence in the buffer is not one of such phone numbers, the interceptor application 320 clears the buffer (step 420) and lets the keystroke event to propagate to other listeners (step 430). If the sequence in the buffer is one of such phone numbers, the interceptor application 320 consumes the keystroke event (i.e., the event is not propagated to other software modules on the phone), clears the buffer, and launches the router application 330 (step 445).

If the phone has voice-activated dialing, the interceptor application 320 can also receive voice-activated dial events and launch the router application 330 when a voice-activated dial command corresponds a phone number for which the interceptor application 320 is listening.

When launched, the router application 330 then provides the user with destination options associated with the phone number dialed by the user (step 450). In one embodiment, this involves playing a voice prompt with the destination options and displaying the destination options in the phone user interface.

If the user stays on line and does not make a selection after a period of time, the router application 330 makes the call to the phone number originally dialed by the user (step 455). In one embodiment, the router application 330 uses an applicable phone call API to make the call.

If the user makes a selection from the list of destination options, the router application 330 maps the selection to a phone number and then makes a call to such phone number (which can be the originally dialed phone number if the user selected the destination associated with such phone number) (step 460).

FIG. 5 illustrates the start up of the interceptor application 320. When the operating system on the phone boots (step 510), the interceptor application 320 is launched as a background application (step 520). The interceptor application 320 then registers for all keystroke events and, if applicable, voice-activated dialing events (step 530), where the interceptor application 320 will receive keystroke events and, if applicable, voice-activated dialing events before any foreground applications, such as the dialer application 340. In some systems, the interceptor application 320 may need to register as a high priority application.

In the preferred embodiment, the requirements for the interceptor application 320 include the following:
 Able to receive all keystroke events and, if applicable, voice-activated dialing events at all times
 Able to consume keystroke events and, if applicable, voice-activated dialing events (so that consumed events are not passed to the dialer application 340)
 Able to launch other applications, namely, the router application 330.

In the preferred embodiment, the requirements for the router application 330 include the following:
 Able to play audio prompts
 Able to display list of destination options in phone user interface
 Able to support timers (so that if the user does not select an option after a period of time, the router application 330 can place a call to the originally dialed phone number)
 Able to make phone calls.

The invention is in no way limited to the above requirements. They merely reflect one way in which to implement the invention.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method for reducing occurrences of misdirected calls to a phone number for a select destination:
 listening for phone numbers dialed by a user on a phone;
 for each phone number dialed by the user, determining on the phone whether the dialed phone number is the phone number for the select destination;
 in response to determining that the dialed phone number is the phone number for the select destination, providing the user with a list of destination options, where the list includes the select destination and at least one alternate destination;
 in response to the user choosing the select destination from the list, placing a call to the select destination; and
 in response to the user choosing an alternate destination from the list, placing a call to the alternate destination chosen by the user instead of the select destination.

2. The method of claim 1 further comprising:
 in response to the user not inputting any choices from the list, placing the call to the select destination after a period of time.

3. The method of claim 1, wherein the list is provided in audio form by playing a voice prompt and in visual form by displaying the list on a user interface on the phone.

4. The method of claim 1, wherein the list of destination options is ordered according to the probability in which each destination option will be selected by a user.

5. The method of claim 1, wherein the select destination is a voice store for a wireless communication carrier, and an alternate destination in the list is customer care for the wireless communication carrier.

6. The method of claim 1, wherein the select destination is an IVR system and wherein an alternate destination is another IVR system.

7. The method of claim 1, wherein the select destination is an entry point to an IVR system and an alternate destination is a different entry point to the IVR system.

8. The method of claim 1, wherein the listening and determining steps further comprise:
 buffering keystrokes entered by a user on the phone;
 in response to one of the keystrokes being a command to send a call, looking at a sequence of keystrokes entered by the user prior to the user entering the command to send a call; and
 determining whether such sequence is the phone number for the select destination.

9. A method for reducing occurrences of misdirected calls to a phone number for a select destination:
 determining whether a sequence of keystrokes entered by a user into a phone is the user dialing the phone number for the select destination;
 in response to determining that the user dialed the phone number for the select destination, providing the user with a list of destination options, where the list includes the select destination and at least one alternate destination;
 in response to the user choosing the select destination from the list, placing a call to the select destination; and
 in response to the user choosing an alternate destination, placing a call to the alternate destination chosen by the user instead of to the select destination.

10. The method of claim 9, further comprising:
 in response to the user not inputting any choices from the list, placing the call to the select destination after a period of time.

11. The method of claim 9, wherein the list is provided in audio form by playing a voice prompt and in visual form by displaying the list on a user interface on the phone.

12. The method of claim 9, wherein the list of destination options is ordered according to the probability in which each destination option will be selected by a user.

13. The method of claim 9, wherein the select destination is a voice store for a wireless communication carrier, and an alternate destination in the list is customer care for the wireless communication carrier.

14. The method of claim 9, wherein the select destination is an IVR system and wherein an alternate destination is another IVR system.

15. The method of claim 1, wherein the select destination is an entry point to an IVR system and an alternate destination is a different entry point to the IVR system.

16. A software program embodied on a computer-readable medium and comprising code that, when executed by a processor on a phone, enables the phone to perform the following method:
 determining whether a sequence of keystrokes entered by a user into the phone is the user dialing the phone number for the select destination;
 in response to determining that the user dialed the phone number for the select destination, providing the user with a list of destination options, where the list includes the select destination and at least one alternate destination;
 in response to the user choosing the select destination from the list, placing a call to the select destination; and in response to the user choosing an alternate destination, placing a call to the alternate destination chosen by the user instead of the select destination.

17. The software program of claim 16, wherein the method further comprises:
in response to the user not inputting any choices from the list, placing the call to the select destination after a period of time.

18. The software program of claim 16, wherein the list is provided in audio form by playing a voice prompt and in visual form by displaying the list on a user interface on the phone.

19. The software program of claim 16, wherein the list of destination options is ordered according to the probability in which each destination option will be selected by a user.

20. The software program of claim 16, wherein the select destination is a voice store for a wireless communication carrier, and an alternate destination in the list is customer care for the wireless communication carrier.

21. The software program of claim 16, wherein the select destination is an IVR system and wherein an alternate destination is another NR system.

22. The method of claim 16, wherein the select destination is an entry point to an NR system and an alternate destination is a different entry point to the IVR system.

23. The method of claim 1, wherein listening for phone numbers dialed by a user on a phone includes listening for voice-activated dial commands.

24. The method of claim 9 further comprising determining whether a voice-activated dial command entered by a user equates to the user dialing the phone number for the select destination.

25. The software program of claim 16, wherein the method further comprises determining whether a voice-activated dial command entered by a user equates to the user dialing the phone number for the select destination.

\* \* \* \* \*